United States Patent [19]

Eufemia

[11] Patent Number: 4,463,021
[45] Date of Patent: Jul. 31, 1984

[54] PIZZA CONE WITH FILLING

[76] Inventor: Joseph C. Eufemia, 318 Reichelt Rd., New Milford, N.J. 07646

[21] Appl. No.: 480,765

[22] Filed: Mar. 31, 1983

[51] Int. Cl.³ .......................................... A21D 13/00
[52] U.S. Cl. ........................................ 426/90; 426/94; 426/132; 426/138
[58] Field of Search ..................... 426/94, 138, 95, 90, 426/132

[56] References Cited

U.S. PATENT DOCUMENTS

| | | | |
|---|---|---|---|
| 1,807,189 | 5/1931 | Bemis | 426/94 |
| 2,697,041 | 12/1954 | Graham | 426/139 |
| 3,410,691 | 11/1968 | Stanley | 426/94 |
| 4,226,355 | 10/1980 | Welfrich | 426/95 |

*Primary Examiner*—Robert A. Yoncoskie
*Assistant Examiner*—Elizabeth A. Hatcher
*Attorney, Agent, or Firm*—Harvey B. Jacobson

[57] ABSTRACT

A hand-held edible product in the form of an edible pizza cone having filling therein. The pizza cone filling may be any filling or topping used on conventional pizzas including but not limited to tomato, cheese, pepperoni, sausage, peppers, mushrooms, anchovies, olives and the like. The cone is edible and has dimensional characteristics enabling it to be conveniently handheld while the food product is being consumed with the cone having sufficient rigidity and structural characteristics enabling it to retain its structural integrity during the time period that the cone would normally be held while being consumed. An inverted cone-like structure is provided interiorly of the cone and internal ribs are formed on the inner surface of the cone to stabilize, grip and retain the pizza filling. Also, the upper end of the cone is provided with an outwardly extending flange or lip to further retain the pizza filling properly associated with the cone while being consumed. A protective cup of foam plastic material, such as "styrofoam", telescopes onto the lower end portion of the pizza cone to protect the hand of the person holding the cone from excessive transfer of heat from the pizza filling and cone and also serving to maintain the structural integrity of the cone and to collect and retain any leakage through the cone.

2 Claims, 4 Drawing Figures

U.S. Patent  Jul. 31, 1984  4,463,021
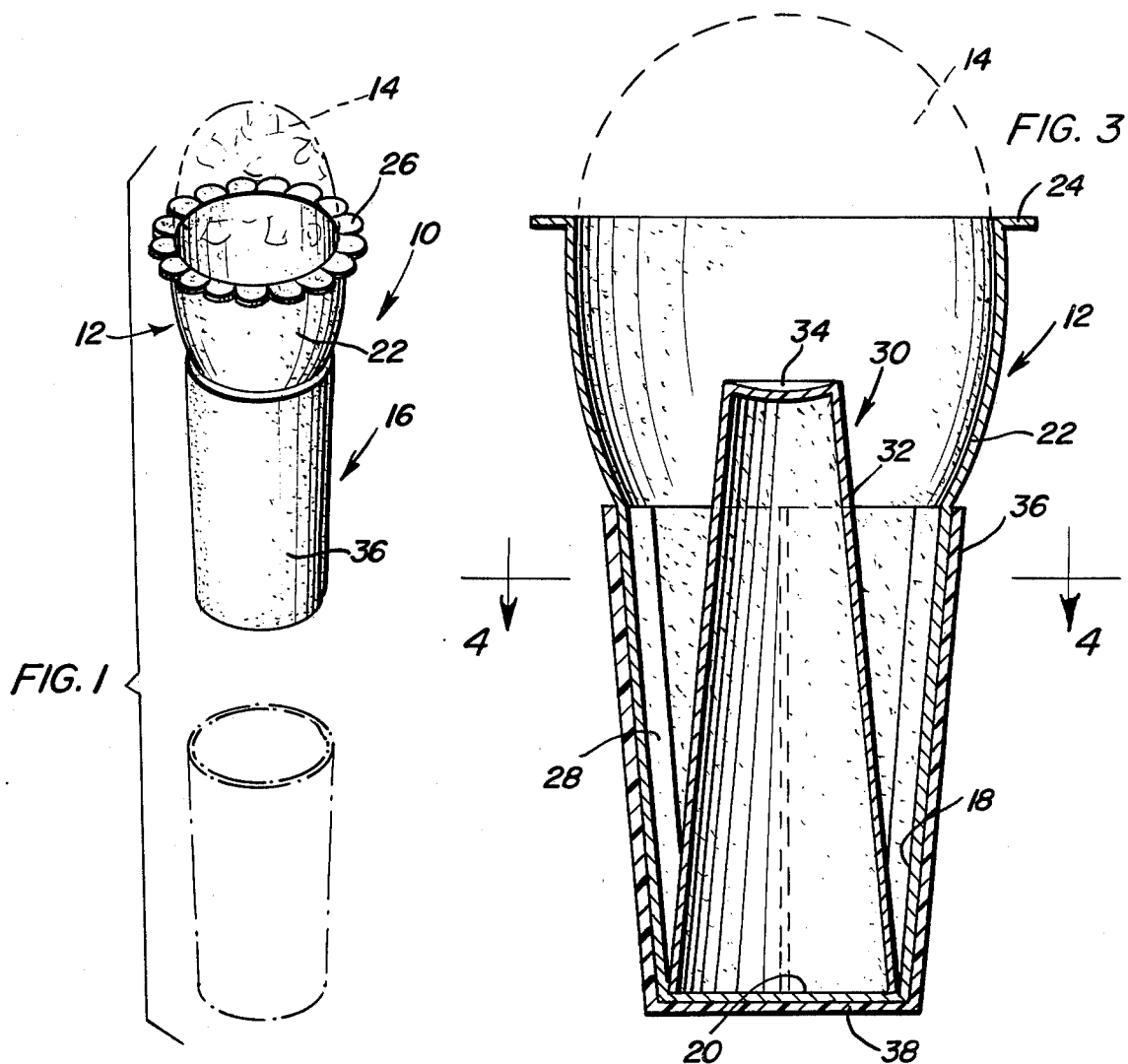
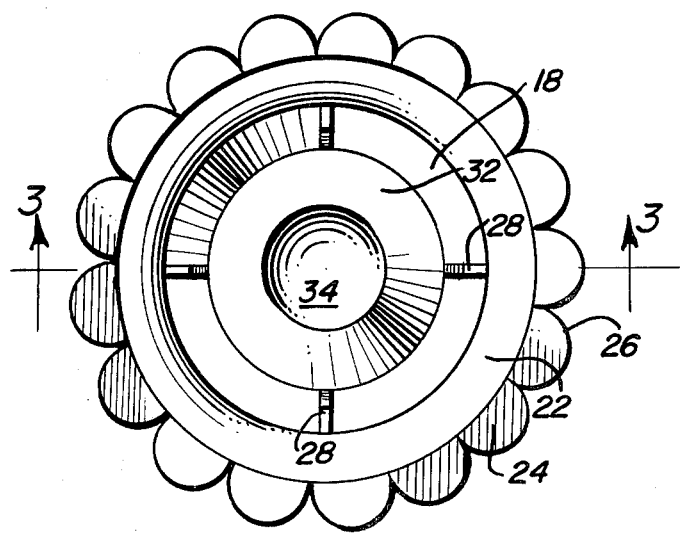
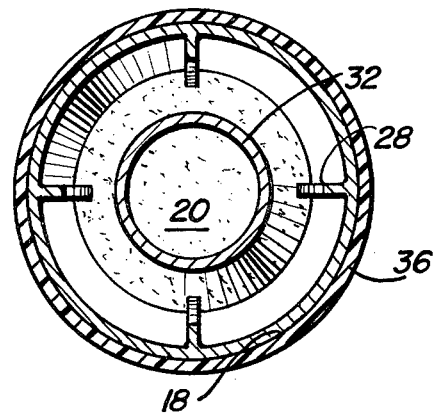

PIZZA CONE WITH FILLING

BACKGROUND OF THE INVENTION

1. Field of the Invention

The present invention generally relates to a handheld edible product and more particularly an edible pizza cone having filling therein with the cone including a unique structure for supporting and retaining the filling and being provided with an insulating and liquid retaining cup inserted over the lower portion of the cone to prevent a person from burning their hand when grasping and holding the cone.

2. Description of the Prior Art

Various types of handheld edible food products are known such as food products of rigid construction having a removable wrapper or the like, ice cream or similar material held in an edible cone, various sandwiches provided with removable wrappers and the like. The following U.S. patents disclose structures relevant to handheld edible food products: U.S. Pat. Nos. 1,715,857 June 4, 1929, 3,290,154 Dec. 6, 1966, 3,410,691 Nov. 12, 1968, 3,615,678 Oct. 26, 1971, 3,879,564 Apr. 22, 1975, 4,313,961 Feb. 2, 1982, 4,313,964 Feb. 2, 1982.

The above-mentioned patents disclose various types of cones and other food products including cones having a double wall for receiving hot food products, cones made from various dough products for containing food products such as chili, beans, beef stew and the like and cones for various other food products including spaghetti and meatballs as well as Mexican foods.

As is well known, pie-shaped pieces of pizza are sold on an individual basis to customers at various types of food distributing establishments. However, due to the somewhat flexible and unstable nature of a piece of pizza, it has not been totally satisfactory as a handheld edible food product such as can be consumed while standing, walking and the like.

SUMMARY OF THE INVENTION

An object of the present invention is to provide a handheld edible food product in the form of an edible pizza cone having an edible product contained therein in the form of a pizza filling which contains various ingredients to form a filling to enable consumption of the pizza cone and pizza filling while standing, walking and the like thereby greatly enhancing the consumability of pizza-type food products.

Another object of the invention is to provide an edible food product in the form of a handheld pizza cone constructed of a dough product which is edible and provided with a filling in the form of a pizza filling.

A further object of the invention is to provide a pizza cone with pizza fillings having an insulating cup-like cover telescoped over the lower end of the cone to protect the hand of the holder from coming into direct contact with the hot cone, maintaining the structural integrity of the lower portion of the cone and catching and retaining any leakage or drippage from the cone which may occur.

Still another object of the invention is to provide a pizza cone with a pizza filling having an inverted cone-like insert of edible dough material to support, position and stabilize the filling within the cone.

A still further object of the invention is to provide a pizza cone with a pizza filling in which the interior of the cone includes vertically disposed inwardly extending ribs or flanges to stabilize the filling and a peripheral external flange at the upper end to reduce the possibility of drippage or leakage of material over the top edge of the cone with the flange or lip being provided with a scalloped outer edge.

Still another important feature of the present invention is to provide a handheld edible cone with an edible pizza filling enabling the pizza filling to be supplied in a frozen condition with the cone and filling being placed in a microwave oven in a rack or other structure to support the cone and filling in place so that the cone and filling may be quickly heated to a desired uniform temperature to enable a person to immediately consume the food product without danger of burning the interior of their mouth, lips and the like with the structure and improved benefits obtained therefrom enabling pizza products to be more widely consumed by individuals who desire to handhold food products while standing, walking and the like such as while shopping in a shopping mall thereby enabling more efficient use of their shopping time.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the pizza cone of the present invention illustrating the manner in which the insulating cup is associated therewith and illustrating a pizza filling therein.

FIG. 2 is a top plan view of the cone illustrating the structure at the upper end thereof including the inwardly extending ribs in the inverted cone interiorly thereof.

FIG. 3 is a vertical sectional view taken substantially upon a plane passing along section line 3—3 on FIG. 2 illustrating the specific structural details of the cone and the insulating cup associated therewith.

FIG. 4 is a transverse, sectional view taken substantially upon a plane passing along section line 4—4 on FIG. 3 illustrating further structural details of the cone.

DESCRIPTION OF THE PREFERRED EMBODIMENT

Referring now specifically to the drawings, the handheld edible food product of the present invention is generally designated by reference numeral 10 and includes a pizza cone 12 receiving a pizza filling 14 with the lower end of the cone 12 being provided with an insulating cup 16.

The cone 12 is constructed of a dough-like material using conventional baking techniques and procedures and includes a lower conical portion 18 which tapers downwardly and terminates in a flat circular bottom 20. The cone 12 also includes an upper portion 22 which is generally conical but provided with a slight curved configuration to form a generally concave interior surface to increase the capacity of the upper end portion of the cone. The upper edge of the upper end portion of the cone is provided with an outwardly extending peripheral flange 24 which may be scalloped around its outer edge as indicated by numeral 26. The cone 12 is of one-piece construction and is constructed so that it can be packaged, stored and handled in a nested condition with similar identical cones. Also, the interior surface of the lower conical portion 18 of the cone 12 is provided with four radially inwardly extending ribs or flanges 28 which serve to rigidify the structure of the cone 12 and also engage the filling to retain the filling in somewhat spaced relation to the inner wall surface of the lower conical portion 18 of the cone 12. The ribs 28 may extend all the way to the top flange 24 if desired.

Positioned interiorly of the cone 12 is an inner cone 30 which includes a downwardly and outwardly tapering conical portion 32 having its large lower end open and engaged with the flat bottom 20 where the flat bottom 20 of the cone 12 joins with the lower end of the conical portion 18 of the cone 12. The upper end of the inner cone 30 terminates adjacent to but above the lower end of the upper end portion 22 of the cone 12 and includes a top wall 24 which may be flat or preferably slightly concave in configuration although the inner cone could be pointed at its upper end. The inner cone 30 serves to stabilize and retain the pizza filling 14 and provides an inner support for the filling to more effectively retain it in a cohesive mass as the filling is being consumed along with the upper edge portions of the pizza cone 12.

To facilitate the cone 12 being held in the hand without discomfort or burning of the hand, the insulating cup 16 is provided. The cup 16 includes an upwardly and outwardly tapering peripheral wall 36 and a flat circular bottom wall 38 which closely fit and telescope over the lower conical portion 18 of the cone 12 and becomes retained on the cone 12 to provide the complete food product 10. The insulating cup 16 is constructed of foam plastic material, preferably "styrofoam" although other foam plastic materials may be used with the thickness of the foam plastic material being adequate to enable a hot cone and filling to be grasped, supported and manipulated by encircling the insulating cup with the hand, thumb and fingers in a conventional and well known manner. The insulating cup 16 is substantially rigid and thus serves as a reinforcement for the lower end portion of the cone 12 in order to maintain the structural integrity thereof. In addition, the insulating cup serves to catch and retain any leakage of flowable filling that may pass through the cone 12. Thus, in addition to the cup 16 serving as an insulating protector, it also serves the purposes of strengthening or reinforcing the cone 12 and at the same time retaining any liquid which may seep through the cone. In addition, the insulating cup 16 may have a trademark, logo and various printed indicia thereon so that it can be observed by a person consuming the food product. The insulating cup can be disposed of in any suitable manner after the cone and filling have been consumed.

While dimensions of the structure may vary, a cone height of approximately 4 inches, a diameter at the upper end of approximately 3 inches, a diameter at the lower end of approximately 1¾ inches, a thickness of approximately 1/16 inch and an interior volume of approximately 9.5 cubic inches have been found adequate with these dimensions being variable depending upon the capacity desired, packaging requirements and the like.

The pizza filling will be produced of gourmet products and preformed and supplied to the customer outlet in frozen form along with the cone 12, the inner cone 30 and the insulating cup 16. When a particular food product is ordered by the customer, the appropriate pizza filling is removed from the freezer storage area and placed in an assembled cone with the assembled cone and filling then being supported in a rack that can be placed in a microwave oven for rapid and even heating of the cone and filling to a predetermined temperature level over a relatively short period of time. The heated food product is removed from the rack and the insulating cup slipped over the lower end thereof so that it then can be handed to a consumer. The cup 16 could also be assembled with the cone prior to it being placed in the microwave oven. The consumer may then easily consume the food product while holding it in the hand thereby enabling the customer to stand or walk around with the food product without it leaking, accidentally falling to the floor and the like thereby greatly enhancing the market potential for pizza-type products since the arrangement disclosed in this application enables the food product to be consumed while the consumer is ambulatory. Examples of the various pizza cones which are contemplated include pizza cone veal and peppers, pizza cone sausage and eggs, pizza cone lasagna, pizza cone chicken cacciatore, pizza cone peppers and eggs, pizza cone veal parmigiana, pizza cone meat balls, pizza cone eggplant parmigiana, diet pizza cone, and other fillings which may be popular in different geographic areas.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A handheld edible food product comprising an edible receptacle having an open upper end and a downwardly extending peripheral wall terminating in a closed lower end, said receptacle being unitarily constructed of edible material, and a pizza filling in the receptacle, extending at least to the open upper end thereof to enable the receptacle and the filling therein to be handheld and consumed, said wall tapering downwardly to form a pizza cone, and an insulating cup of foam plastic telescoped over and supported by the external surface of at least the lower portion of the pizza cone to protect the hand of the person holding the cone from discomfort or injury due to burning, to stabilize the structural integrity of the cone and to catch and retain any liquid leakage through the cone, said pizza cone including a plurality of radially extending ribs in the lower end portion to engage the pizza filling to stabilize it and tend to hold it away from the wall of the cone, said pizza cone including an internal, inverted inner cone having a downwardly and outwardly tapering wall supported from said pizza cone with the upper end of the inner cone having a closed end for supporting and stabilizing the pizza filling, the upper end of said inner cone including a concave top wall for receiving and positioning said filling, said pizza cone wall including an outwardly bellied upper end portion defining an inwardly facing concave surface for increasing the capacity of the cone and rigidifying the upper end thereof, the upper end of said inner cone being disposed above the lower end of the bellied upper end portion of the pizza cone, said insulating cup terminating at the juncture between the upper end portion and the lower end portion of the pizza cone to enable consumption of the upper end portion of the cone and the pizza filling therein without interference, said ribs terminating at the juncture between the upper and lower end portions of the pizza cone for reinforcing the area of the pizza cone on which grasping forces are exerted when holding the cone.

2. The food product as defined in claim 1 wherein the upper end of the pizza cone includes an outwardly extending peripheral flange defining a lip to retain food products from dripping over the top edge of the cone.

* * * * *